US009213702B2

(12) United States Patent  
Chen et al.

(10) Patent No.: US 9,213,702 B2  
(45) Date of Patent: Dec. 15, 2015

(54) METHOD AND SYSTEM FOR RECOMMENDING RESEARCH INFORMATION NEWS

(71) Applicant: NATIONAL CHENG KUNG UNIVERSITY, Tainan (TW)

(72) Inventors: Chao-Chun Chen, Tainan (TW); Ding-Chau Wang, Tainan (TW); Bo-Yan Chen, Tainan (TW); Gen-Ming Guo, Kaohsiung (TW)

(73) Assignee: National Cheng Kung University, Tainan (TW)

( * ) Notice: Subject to any disclaimer, the term of this patent is extended or adjusted under 35 U.S.C. 154(b) by 209 days.

(21) Appl. No.: 14/105,486

(22) Filed: Dec. 13, 2013

(65) Prior Publication Data

US 2015/0169563 A1    Jun. 18, 2015

(51) Int. Cl.  
G06F 17/30    (2006.01)

(52) U.S. Cl.  
CPC ...... *G06F 17/30011* (2013.01); *G06F 17/3053* (2013.01); *G06F 17/30598* (2013.01); *G06F 17/30864* (2013.01)

(58) Field of Classification Search  
USPC .......................................... 707/706, 708, 730  
See application file for complete search history.

(56) References Cited

U.S. PATENT DOCUMENTS

| | | | | |
|---|---|---|---|---|
| 7,739,602 B2* | 6/2010 | Feng | ...................... | G06Q 10/10 709/201 |
| 8,131,702 B1* | 3/2012 | Bharat | ................ | G06F 17/3071 707/706 |
| 8,316,292 B1* | 11/2012 | Verstak | ............... | G06F 17/2211 715/229 |
| 8,607,140 B1* | 12/2013 | Pascovici | ............ | G06F 17/3089 715/205 |
| 2002/0198869 A1* | 12/2002 | Barnett | ............. | G06F 17/30864 1/1 |
| 2004/0034633 A1* | 2/2004 | Rickard | ........... | G06F 17/30864 1/1 |
| 2007/0266020 A1* | 11/2007 | Case | ................. | G06F 17/30734 1/1 |
| 2010/0280981 A1* | 11/2010 | Kato | ................. | G06F 17/30982 706/20 |
| 2010/0332520 A1* | 12/2010 | Lu | ......................... | G06Q 10/10 707/769 |
| 2011/0035345 A1* | 2/2011 | Duan | ................ | G06F 17/30873 706/12 |
| 2011/0113047 A1* | 5/2011 | Guardalben | ........ | G06F 17/2785 707/754 |
| 2011/0231382 A1* | 9/2011 | Xu | .................... | G06F 17/30864 707/706 |
| 2012/0290988 A1* | 11/2012 | Sun | ................... | G06F 17/30572 715/853 |
| 2014/0032567 A1* | 1/2014 | Assadollahi | ...... | G06F 17/30864 707/742 |

* cited by examiner

*Primary Examiner* — Cam-Linh Nguyen  
(74) *Attorney, Agent, or Firm* — Rosenberg, Klein & Lee

(57) ABSTRACT

A method and system for recommending research information news includes a processing unit, an inputting interface, a database group, a data collecting and analysis subsystem, and a recommending subsystem and includes steps of inputting at least one retrieval condition to collect correlative research documents including a publishing timing and linguistic units according to the retrieval condition on an internet, grouping the research documents into at least two groups comprising a group of early research documents and another group of new recent research documents according to the publishing timing and a judging timing, subjecting the linguistic units to computer term frequency statistics, a document measurement, and a data surveying to generate research keywords, and filtering out the research keywords of the new recent research documents repeating those of the early research documents for recommending a new recent research keyword.

22 Claims, 14 Drawing Sheets

| Data analytical subsystem | | | | | |
|---|---|---|---|---|---|
| Evaluation of factors of hot research documents | Please choose ⌄ | Importing source route | Order ⌄ | | |
| Recommendation of hot research documents | Proseminar | C:\ERP\ERP.htm | Article title | | |
| | Patent | | Author | | |
| Evaluation of factors of prospective research documents | Masters' theses and doctoral dissertations | Browse  Import | Journal | | |
| Recommendation of prospective research documents | Journal | | Volume | | |
| Verification of recommendation system of research information news | Article title | Publication | Journal | Volume | Publication year |
| | Measures of pluralistic sources of technological news | Ku-Chin | Technological news | Vol, 12B, 2011 | 2010/12 |
| Verification subsystem | Objective discussion of measurement analysis of technological news | Huang, Yi-Fang | Technological news | Vol, 1B, 2011 | 2010/12 |
| Original analysis | Evaluation and discussion of factors of hot technical news | Lee, Cheng | Technological news | Vol, 1B, 2011 | 2010/12 |
| | Advantages of recommending hot technological technique news | Lee, Lin | Technological news | Vol, 1B, 2011 | 2010/12 |
| | Evaluation and discussion of factors of prospective technique news | Jin, Wei-Chien | Technological news | Vol, 1B, 2011 | 2010/12 |
| | Advantages of recommending prospective technological technique news | Lee, Chong | Technological news | Vol, 1B, 2011 | 2010/12 |
| | Advantages of verification of recommendation system of technological news | Huang, Yi | Technological news | Vol, 1B, 2011 | 2010/12 |
| | Page 1 (3 pages in total) | | | Go to page 1, 2, 3 | |

FIG. 2

Prospective index analysis module

| Evaluation of factors of hot research documents |
|---|
| Recommendation of hot research documents |
| Evaluation of factors of prospective research documents |
| Recommendation of prospective research documents |
| Verification of recommendation system of research information news |
| Verification subsystem |
| Original analysis |

Input an analysis topic: ERP

Please choose ⌄
- Proseminar
- Patent
- Masters' theses and doctoral dissertations
- Journal Word survey function: term-frequency analysis function:
TD-IFD analysis function $$Pr(gravity) = \frac{\text{Sum of particular data sources}}{\text{Sum of all data sources}}$$

Analyzing time range:
from 2010 ⌄ year 1 ⌄ month
to 2011 ⌄ year 1 ⌄ month

[ Send ]

Analysis result

Formula
$P = Pr \times We \times \Sigma TF - IDF$
Note:
1. P= prospective index
2. Pr= reference source gravity
3. We=reference source weight
4. n= Year range
Pr(gravity)=
Types of particular data sources
1. Article title; 2. Abstract;
3. Full text; 4. References

| Order | ⌄ |
|---|---|
| Item number | |
| Topic | |
| Year/month | |
| Rank | |
| Prospective index | |

| Rank | Foreseeing index |
|---|---|
| 1 | 90% |
| 2 | 85% |
| 3 | 75% |
| 4 | 65% |
| 5 | 55% |

| Item number | Topic | Year/month |
|---|---|---|
| 001 | System of planning mobile business enterprise resource | 2010/12 |
| 002 | System of planning RFID enterprise resource | 2010/11 |
| 003 | System of planning artificial intelligence enterprise resource | 2010/10 |
| 004 | System of planning business intelligence enterprise resource | 2010/08 |
| 005 | System of planning cloud intelligence enterprise resource | 2010/06 |

Page 1 ( 3 pages in total)    Go to page 1, 2, 3

F I G . 3

Hot index analysis module

| Evaluation of factors of hot research documents |
| Recommendation of hot research documents |
| Evaluation of factors of prospective research documents |
| Recommendation of prospective research documents |
| Verification of recommendation system of research information news |
| Verification subsystem |
| Original analysis |

Input an analysis topic:

ERP

- Please choose
- Proseminar
- Patent
- Masters' theses and doctoral dissertations
- Journal Word survey function:
term-frequency analysis function:

TD-IFD analysis function $$Pr(gravity) = \frac{\text{Sum of particular data sources}}{\text{Sum of all data sources}}$$

Analyzing time range:
from 2008 year 1 month
to 2011 year 1 month

Send

Analysis result

Formula
$H = Pr \times We \times \sum TF - IDF$
Note:
1. P= prospective index
2. Pr= reference source gravity
3. We=reference source weight
4. n= Year range
Pr(gravity)=
Types of particular data sources
1. Article title; 2. Abstract;
3. Full text; 4. References

| Order | |
|---|---|
| Item number | |
| Topic | |
| Year/month | |
| Rank | |
| Prospective index | |

| Item number | Topic |
|---|---|
| 001 | System of planning RFID enterprise resource |
| 002 | System of planning artificial intelligence enterprise resource |
| 003 | System of planning mobile business enterprise resource |
| 004 | System of planning cloud intelligence enterprise resource |
| 005 | System of planning business intelligence enterprise resource |

| Year/month | Rank | Foreseeing index |
|---|---|---|
| 2010/12 | 1 | 90% |
| 2010/11 | 2 | 85% |
| 2010/10 | 3 | 75% |
| 2010/08 | 4 | 65% |
| 2010/06 | 5 | 55% |

Page 1 ( 3 pages in total)     Go to page 1, 2, 3

| | Evaluation of factors of prospective research documents |
|---|---|
| Evaluation of factors of hot research documents | 1. Overlaying issues of multiple journals are suitable to be projects of factor evaluation and research issues of the prospective technical news<br>☐ very agree ☐ agree ☐ medium ☐ disagree ☐ very disagree |
| Recommendation of hot research documents | 2. Overlaying issues of multiple special competitions are suitable to be projects of factor evaluation and research issues of the prospective technical news<br>☐ very agree ☐ agree ☐ medium ☐ disagree ☐ very disagree |
| Evaluation of factors of prospective research documents | 3. Overlaying issues of article solicitations of multiple proseminars are suitable to be projects of recommendation and research issues of the prospective technological and technical news<br>☐ very agree ☐ agree ☐ medium ☐ disagree ☐ very disagree |
| Recommendation of prospective research documents | 4. Overlaying issues of multiple masters' theses and doctoral dissertations are suitable to be projects of recommendation and research issues of the prospective technological and technical news<br>☐ very agree ☐ agree ☐ medium ☐ disagree ☐ very disagree |
| Verification of recommendation system of research information news | 5. Overlaying research fields of multiple preeminent scholars are suitable to be projects of recommendation and research issues of the prospective technological news<br>☐ very agree ☐ agree ☐ medium ☐ disagree ☐ very disagree |
| Verification subsystem | 6. Overlaying topic statistics of multiple patents are suitable to be projects of survey and research issues of the prospective technological news<br>☐ very agree ☐ agree ☐ medium ☐ disagree ☐ very disagree |
| Original analysis | 7. New invention fields of multiple preeminent inventors are suitable to be projects of recommendation and research issues of the prospective technological news<br>☐ very agree ☐ agree ☐ medium ☐ disagree ☐ very disagree |
| | Page 1 ( 3 pages in total)    Go to page 1, 2, 3 |

72A

F I G . 6

| | Evaluation of factors of hot research documents |
|---|---|
| Evaluation of factors of hot research documents | 1. Overlaying issues of multiple journals are suitable to be projects of factor evaluation and research issues of the hot technical news<br>☐ very agree ☐ agree ☐ medium ☐ disagree ☐ very disagree |
| Recommendation of hot research documents | 2. Overlaying issues of multiple special competitions are suitable to be projects of factor evaluation and research issues of the hot technical news<br>☐ very agree ☐ agree ☐ medium ☐ disagree ☐ very disagree |
| Evaluation of factors of prospective research documents | 3. Overlaying issues of article solicitations of multiple proseminars are suitable to be projects of recommendation and research issues of the hot technological and technical news<br>☐ very agree ☐ agree ☐ medium ☐ disagree ☐ very disagree |
| Recommendation of prospective research documents | 4. Overlaying issues of multiple masters' theses and doctoral dissertations are suitable to be projects of recommendation and research issues of the hot technological and technical news<br>☐ very agree ☐ agree ☐ medium ☐ disagree ☐ very disagree |
| Verification of recommendation system of research information news | 5. Overlaying research fields of multiple preeminent scholars are suitable to be projects of recommendation and research issues of the hot technological news<br>☐ very agree ☐ agree ☐ medium ☐ disagree ☐ very disagree |
| Verification subsystem | 6. Overlaying topic statistics of multiple patents are suitable to be projects of survey and research issues of the hot technological news<br>☐ very agree ☐ agree ☐ medium ☐ disagree ☐ very disagree |
| Original analysis | 7. New invention fields of multiple preeminent inventors are suitable to be projects of recommendation and research issues of the hot technological news<br>☐ very agree ☐ agree ☐ medium ☐ disagree ☐ very disagree |
| | Page 1 ( 3 pages in total)    Go to page 1, 2, 3 |

72B

F I G . 7

| | Verification subsystem |
|---|---|
| | Dear sirs<br>Thanks for your participation on a trial of our method and system of recommendation of hot technological news. To verify our mode and system, we will use TAM (Technology Acceptance Model) of FredD.Davis to conduct the questionnaire and survey the usability of the subject system. This questionnaire survey is only used for academic researches and is set by analyzing groups. It is not set by analyzing an individual and not published. Your participation has a great contribution to the researches. Thanks for your reply and support.<br><br>Part 1-Individual information<br>Service section: ▶<br>Service department: ▶<br>Title: ▶<br>Academic degree: ▶<br>Age: ▶<br>Gender: ▶<br>Experience of using the computer: ▶ |
| Questionnaire survey | |
| Questionnaire analysis | Part 2-Degree of Usability<br>1. It is easy for me to learn the operation of the method and system of recommendation of technological news<br>   ☐very agree ☐agree ☐medium ☐disagree ☐very disagree<br>2. I find that it is easy to complete what I want to do by using the method and system of recommendation of technological news<br>   ☐very agree ☐agree ☐medium ☐disagree ☐very disagree<br>3. I find that the interaction between me and the method and system of recommendation of technological news is clear and understandable<br>   ☐very agree ☐agree ☐medium ☐disagree ☐very disagree<br>4. I find that the method and system of recommendation of technological news is flexible<br>   ☐very agree ☐agree ☐medium ☐disagree ☐very disagree<br>5. It is very easy for me to learn the operating skill of the method and system of recommendation of technological news<br>   ☐very agree ☐agree ☐medium ☐disagree ☐very disagree<br>6. I find that it is easiest to use the method and system of recommendation of technological news<br>   ☐very agree ☐agree ☐medium ☐disagree ☐very disagree |

FIG. 8A

Part 3- Usefulness of the system
1. The use of the method and system of recommendation of technological news can help me to complete the decision works more quickly
   ☐ very agree ☐ agree ☐ medium ☐ disagree ☐ very disagree
2. The use of the method and system of recommendation of technological news can increase my working performance
   ☐ very agree ☐ agree ☐ medium ☐ disagree ☐ very disagree
3. The use of the method and system of recommendation of technological news can increase my working productivity
   ☐ very agree ☐ agree ☐ medium ☐ disagree ☐ very disagree
4. The use of the method and system of recommendation of technological news can increase the efficiency of my working decisions
   ☐ very agree ☐ agree ☐ medium ☐ disagree ☐ very disagree
5. The use of the method and system of recommendation of technological news makes my working decisions easier
   ☐ very agree ☐ agree ☐ medium ☐ disagree ☐ very disagree
6. The use of the method and system of recommendation of technological news is helpful to my working decisions
   ☐ very agree ☐ agree ☐ medium ☐ disagree ☐ very disagree

FIG. 8B

METHOD AND SYSTEM FOR RECOMMENDING RESEARCH INFORMATION NEWS

BACKGROUND OF THE INVENTION

1. Field of the Invention

The present invention relates to a method and system for recommending research information news, in particular to one which uses a judging timing to divide the research documents into early and new recent research documents, then uses the computer system to gather statistics of the linguistic units of the research documents and make analysis to generate research keywords, and thence filters out the research keywords of the new recent research documents repeating those of the early research documents, thereby obtaining the new recent research keywords.

2. Description of the Related Art

Following the coming of the intellectual economic time, the academic innovation technique is updated more quickly and becomes pluralistic to cause the screening and selecting of the academic releases to become an extremely challengeable issue.

Therefore, a prior technique published by Taiwan patent no. 201314477 and titled by "an analytical method and system for hot and foreseeing R&D information" is disclosed. The system comprises a processing unit, a database analytical subsystem, a database module, a hot research analysis subsystem, a foreseeing research analysis subsystem, a factor evaluation subsystem, a hot research verification subsystem, a foreseeing research verification subsystem, and a search and browser subsystem. The processing unit includes an operating interface and a display interface. The database analytical subsystem is built in the processing unit. The database analytical subsystem comprises an editing and managing module and a data processing module for importing an external data. By using the system, the operating interface is applied to select the academic document derived from a particular year range, such as a year range n and set by n≤2 or 5≤n≤10, then the foreseeing research analysis subsystem or the hot research analysis subsystem uses a TF-IDF surveying technique to gather statistics of the number of appearing times of the technical keywords of the academic documents within the selected particular year range. Thence the foreseeing indexes or hot indexes of these academic documents can be analyzed to assist users in selecting foreseeable or hot academic documents.

However, the prior art still needs improvements with the reasons:

1. The prior technique must use the particular hot or foreseeable keywords and cooperate with the TF-IDF surveying technique to gather statistic of the number of appearing times of the technical keywords of the academic documents within the particular year range to analyze and obtain the foreseeing or the hot indexes. The prior technique cannot be a suitable analysis condition as users unfamiliar with the related keywords of the field cannot use proper keywords easily.

2. The prior technique can only find out the distinct and critical words from the academic documents but cannot find out the novel or hot words which are not distinct but critical to the technique.

3. The prior system cannot help users find out the author who makes the most contribution to the research document when it is applied to the news field since large numbers of authors participating in the research document would cause the user to have difficulty in interviewing the author in case the system does not help the screening operation.

SUMMARY OF THE INVENTION

Therefore, to let users screen the foreseeable or hot research documents more easily, the inventor devotes his research to providing a method for recommending research information news which is applied to a computer system and executed by following steps of collecting data, analyzing data and recommending research information. The step of collecting data comprises the steps of inputting at least one retrieval condition for determining a specific research field and collecting a plurality of correlative research documents, on an Internet, based on the at least one retrieval condition, wherein each of the plurality of correlative research documents has a respective publishing timing and a plurality of linguistic units. The step of analyzing data comprises the steps of grouping the plurality of correlative research documents into at least two research document groups according to the respective publishing timing and a judging timing of each of the correlative research documents, wherein the at least two research document groups comprise a group of a plurality of early research documents and another group of a plurality of new recent research documents and using the computer system to subject the plurality of linguistic units of the early research documents and the new recent research documents to term frequency statistics, a bibliometric and a data mining to generate a plurality of research keywords. The step of recommending research information comprises the step of filtering out one or more of the research keywords of the new recent research documents to generate at least one new recent research keyword, the one or more of the research keywords of the new recent research documents appearing in both of the early research documents and the new recent research documents.

Preferably, the plurality of correlative research documents are adopted by patents, theses, textbooks, news, or a combination thereof, and the step of analyzing data further comprises the steps of subjecting each of the plurality of linguistic units to inverse document frequency statistics to obtain a respective correlation degree of each of the linguistic units relative to the plurality of correlative research documents, and generating the plurality of research keywords based on the respective correlation degree of each of the plurality of linguistic units.

Preferably, the step of recommending research information further comprises the steps of calculating how often the at least one new recent research keyword appears in each of the plurality of new recent research documents to obtain a respective appearing frequency or score of each of the plurality new recent research documents, and recommending at least one of the new recent research documents based on the respective appearing frequency or score of each of the plurality of new recent research documents.

Preferably, the judging timing is set by a year range n and a condition of 0<n<4 such that the at least one new recent research keyword is defined as a prospective research keyword, and the step of recommending research information further comprises the steps of calculating how often the prospective research keyword appears in each of the plurality of new recent research documents to obtain a respective prospective index of each of the plurality of new recent research documents, and selecting at least one of the new recent research documents to be set as a prospective research document based on the respective prospective index of each of the new recent research documents.

Preferably, the prospective index is attained by the following formula:

$$P = Pr_t \times We_t \times \sum_{j=0}^{n} TF - IDF_j,$$

in which P represents a foreseeing index, $Pr_t$ represents a reference source gravity, $We_t$ represents a reference source weight, and n represents a year range and meets a condition of 0<n<4.

Preferably, the judging timing is set by a year range n and a condition of 4≤n≤10 such that the at least one new recent research keyword is defined as a hot research keyword, and the step of recommending research information further comprises the steps of calculating how often the hot research keyword appears in each of the plurality of new recent research documents to obtain a respective hot index of each of the plurality of new recent research documents, and selecting at least one of the new recent research documents to be set as a hot research document based on the respective hot index of each of the plurality of new recent research documents.

Preferably, the hot index is attained by the following formula:

$$H = Pr_n \times We_n \times \sum_{j=0}^{n} TF - IDF_j,$$

in which H represents a hot index, $Pr_n$ represents a reference source gravity, $We_n$ represents a reference source weight, and n represents a year range and meets a condition of 4≤n≤10.

Preferably, each of the plurality of correlative research documents has a respective basic information form, the respective basic information form listing a respective cited-times, and the step of recommending research information further comprises the steps of calculating a respective pioneer impact factor of each of the plurality of new recent research documents according to the respective cited-times and a total number of the plurality of new recent research documents, and filtering out one or more of the new recent research documents, the one or more of the new recent documents having respective pioneer impact factors failing to reach a threshold value.

Preferably, the pioneer impact factor is attained by the following formula:

$$PIF = \log\left(\sum_{c1}^{n} \frac{Ci}{S} x(cy - py)^w\right),$$

in which PIF represents a pioneer impact factor, Ci represents a cited-times of a particular research document, Cy represents a current year, Py represents a year of publication of the particular research document, S represents a total number of research documents in a particular field, and W represents a constant.

Preferably, each of the plurality of correlative research documents has a respective basic information form, the respective basic information form listing a plurality of authors, and the step of recommending research information further comprises the steps of searching for the plurality of authors of a corresponding research document respectively, on the internet, to get a plurality of research publications corresponding to each of the plurality of authors and a respective cited-times of each of the research publications as well and to derive a respective research capability index of each of the plurality of authors, and recommending at least one of the authors based on the respective research capability index of each of the plurality of authors.

Preferably, the method of the present invention further comprises the steps of factor estimating and verifying. The step of factor estimating comprises the step of providing at least one questionnaire to adjust the reference source weight according to a result of the questionnaire. The step of verifying comprises the steps of providing a usefulness evaluation questionnaire to evaluate a usefulness of the step of recommending research information, and providing a usability evaluation questionnaire to evaluate a user acceptance of the step of recommending research information.

The present invention also provides a system for recommending research information news. The system comprises a processing unit, an inputting interface, a database group, a data collecting subsystem, a data analysis subsystem and a recommending subsystem. The inputting interface is connected to the processing unit for inputting a retrieval keyword and a judging timing, the retrieval keyword used to determine a specific research field. The database group is connected to the processing unit, the database group comprising a setting database and a research document database, the setting database being applied to save the retrieval keyword and the judging timing. The data collecting subsystem is connected to the processing unit for collecting a plurality of research documents and saving the research documents in the research document database, the research documents each including a plurality of linguistic units and a respective publishing timing. The data analysis subsystem is connected to the processing unit, the data analysis subsystem comprising a document classification module and a data surveying module, the document classification module grouping the research documents into at least two groups according to the respective publishing timing of each of the research documents and the judging timing as well, the at least two groups comprising a group of a plurality of early research documents and another group of a plurality of new recent research documents, the data surveying module subjecting the plurality of linguistic units of each of the research documents to term frequency statistics, a document measurement, and a data mining by using the processing unit to obtain a plurality of research keywords. The recommending subsystem connected to the processing unit, the recommending subsystem comprising a word-filtering module, the word-filtering module filtering out one or more of the research keywords of the new recent research documents to generate at least one new recent research keyword, the one or more of the research keywords of the new recent research documents appearing in both of the early research documents and the new recent research documents.

Preferably, the data analysis subsystem further comprises an inverse document frequency statistics module for subjecting each of the plurality of linguistic units to inverse document frequency statistics to obtain a respective correlation degree of each of the linguistic units relative to the plurality of research documents and generating the plurality of research keywords based on the respective correlation degree of each of the plurality of linguistic units, and the recommending subsystem is further applied to calculate how often the at least one new recent research keyword appears in each of the plurality of new recent research documents to obtain a respective appearing frequency or score of each of the plurality new recent research documents and recommend at least one of the new recent research documents based on the respective appearing frequency or score of each of the plurality of new recent research documents.

Preferably, the judging timing is set by a year range n and a condition of 0<n<4 such that the at least one new recent research keyword is defined as a prospective research keyword, and the recommending subsystem further comprises a prospective index analysis module for calculating how often the prospective research keyword appears in each of the plurality of new recent research documents to obtain a respective prospective index of each of the plurality of new recent research documents and selecting at least one of the new recent research documents to be set as a prospective research document based on the respective prospective index of each of the new recent research documents.

Preferably, the prospective index is attained by the following formula:

$$P = Pr_t \times We_t \times \sum_{j=0}^{n} TF - IDF_j,$$

in which P represents a prospective index, $Pr_t$ represents a reference source gravity, $We_t$ represents a reference source weight, and n represents a year range and meets a condition of 0<n<4.

Preferably, the judging timing is set by a year range n and a condition of 4≤n≤10 such that the at least one new recent research keywords is defined as a hot research keyword, and the recommending subsystem further comprises a hot index analysis module for calculating how often the hot research keyword appears in each of the plurality of new recent research documents to obtain a respective hot index of each of the plurality of new recent research documents and selecting at least one of the new recent research documents to be set as a hot research document based on the respective hot index of each of the plurality of new recent research documents.

Preferably, the hot index is attained by the following formula:

$$H = Pr_n \times We_n \times \sum_{j=0}^{n} TF - IDF_j,$$

in which H represents a hot index, $Pr_n$ represents a reference source gravity, $We_n$ represents a reference source weight, and n represents a year range and meets a condition of 4≤n≤10.

Preferably, each of the plurality of research documents has a respective basic information form, the respective basic information form lists a respective cited-times, and the recommending subsystem further comprises an original analysis module for calculating a respective pioneer impact factor of each of the plurality of new recent research documents according to the respective cited-times and a total number of the plurality of new recent research documents and filtering out one or more of the new recent research documents, the one or more of the new recent research documents having pioneer impact factors failing to reach a threshold value, wherein the respective pioneer impact factor is attained by the following formula:

$$PIF = \log\left(\sum_{c1}^{n} \frac{Ci}{S} x(cy - py)^w\right),$$

in which PIF represents a pioneer impact factor, Ci represents a cited-times of a particular research document, Cy represents a current year, Py represents a year of publication of the particular research document, S represents a total number of research documents in a particular field, and W represents a constant.

Preferably, the respective basic information form of each of the research documents further lists a plurality of authors, and the recommending subsystem further includes a research capability analysis module for searching for the plurality of authors of a corresponding research document respectively, on the internet, to get a plurality of research publications corresponding to each of the plurality of authors and a respective cited-times of each of the research publications as well and to perform an index calculation with respect to a total number of related publications to derive a respective research capability index of each of the authors of the corresponding research document and recommending at least one of the authors as a pioneering author based on the respective research capability index of each of the plurality of authors.

Preferably, the system of the present invention further comprises a factor estimation subsystem and a verification subsystem both connected to the processing unit, wherein the factor estimation subsystem comprises a questionnaire survey module to provide at least one questionnaire and allows the recommending subsystem to adjust the reference source weight according to a result of the questionnaire, and the verification subsystem includes a usefulness term search module and a usability term search module, the usefulness term search module providing a usefulness-evaluation questionnaire for evaluating a usefulness of the recommending subsystem, the usability term search module providing a usability-evaluation questionnaire for evaluating a user acceptance of the recommending subsystem.

The effects of the present invention are described as follows:

1. By using the early research document as the filtering criteria of the late research document, the present invention can filter out the foreseeable keywords or hot keywords vital to the technique to assist users in obtaining the foreseeable keywords or hot keywords which are important to the technique. Therefore, users unfamiliar with related keywords of the field can use proper keywords to analyze the research documents.

2. When the present invention is applied to the news field, it can help users to find out the original research information and further seek out the author making the main contribution to the original research information, whereby the users can find out suitable targets quickly to make interviews. The present invention is especially adapted to the news field.

BRIEF DESCRIPTION OF THE DRAWINGS

FIG. 2 is a schematic view showing the user interface of the data analytical subsystem of the present invention;

FIG. 3 is a schematic view showing the user interface of the prospective index analysis module of the present invention;

FIG. 4 is a schematic view showing the user interface of the hot index analysis module of the present invention;

FIG. 5 is a schematic view showing the user interface of the original analysis module of the present invention;

FIG. 6 is a schematic view showing the user interface of the factor estimation subsystem for the prospective documents of the present invention;

FIG. 7 is a schematic view showing the user interface of the factor estimation subsystem for the hot research documents of the present invention;

FIGS. 8A and 8B show the user interface of the verification subsystem of the present invention;

DETAILED DESCRIPTION OF THE PREFERRED EMBODIMENTS

Figure 1:
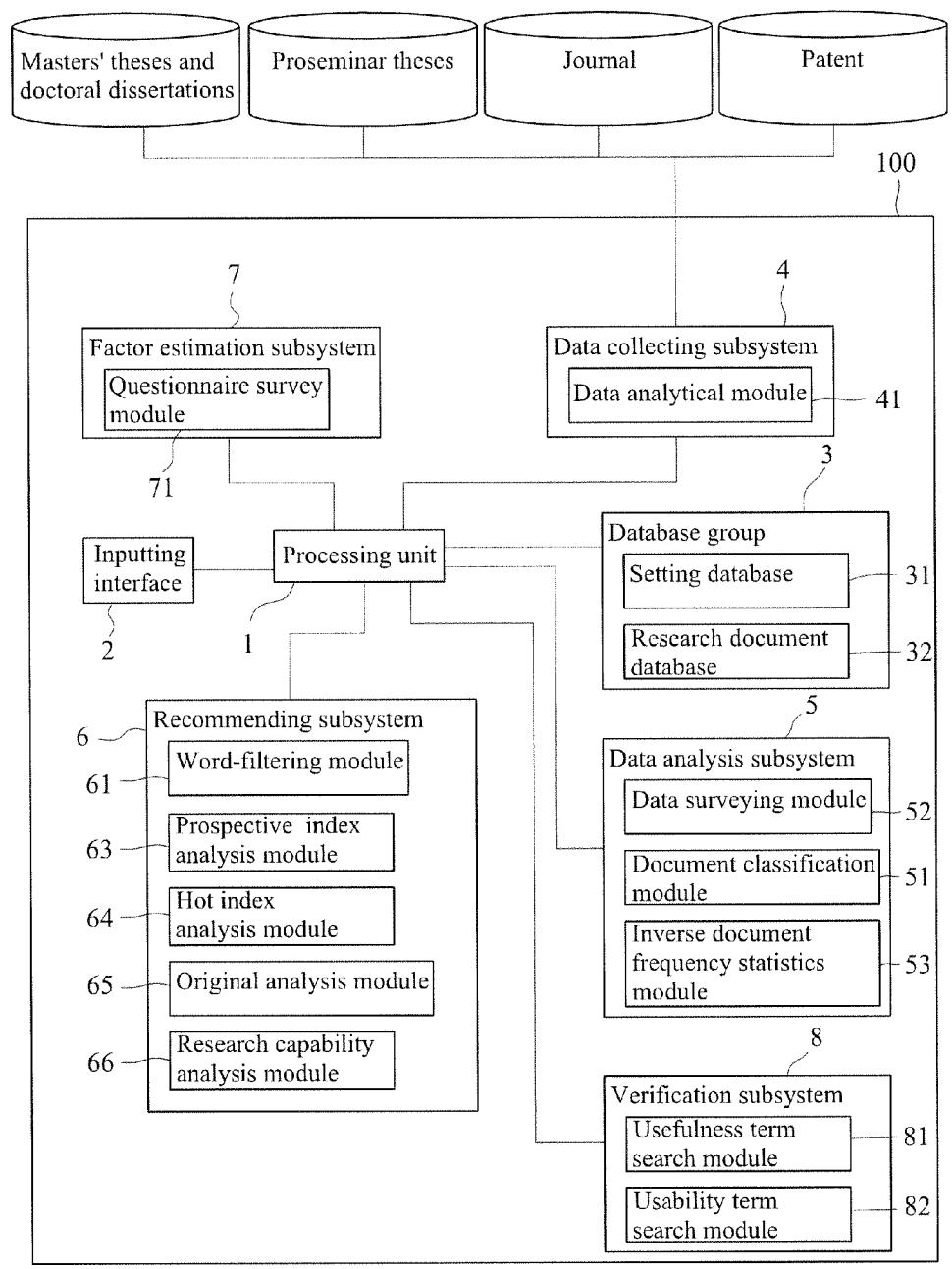
FIG. 1 is a schematic view showing the system of the present invention.

By combining the aforementioned features, the main advantages of the system 100 for recommending research information news are more apparent upon reading following preferred embodiments. Referring to FIG. 1, the system 100 for recommending research information news in accordance with the present invention comprises a processing unit 1, an inputting interface 2, a database group 3, a data collecting subsystem 4, a data analysis subsystem 5, and a recommending subsystem 6.

The processing unit 1 possesses the effects of logically computing, controlling and receiving, and exporting instructions of other hardware elements.

The inputting interface 2 is connected to the processing unit 1 for inputting a retrieval keyword and a judging timing. The retrieval keyword is used to determine a specific research field; for example, the input of the retrieval keyword, such as RFID, can be determined as a research field correlating with the near field communication.

The database group 3 is connected to the processing unit 1. The database group 3 comprises a setting database 31 and a research document database 32. The setting database 31 is applied to save the retrieval keyword and the judging timing.

The data collecting subsystem 4 is connected to the processing unit 1 for gathering a plurality of research documents and saving them in the research document database 32. Each of the research documents includes a plurality of linguistic units and a publishing timing. The linguistic units can be words or phrases, and the publishing timing can be a time when the research document is published.

Specifically, the research documents can be adopted by academic research documents or industrial research documents, such as patents, theses, textbooks, news, and others. These research documents are firstly listed in order of data article titles, authors, journal titles, volume numbers, publication years and months, etc. by using a data analytical module 41 and then stored in the research document database 32, whereby users can search for journals, conference paper, patents, and masters' theses as well as doctoral dissertations that they wish to browse via a user interface provided (as shown in FIG. 2) by the data analytical module 41.

The data analysis subsystem 5 is connected to the processing unit 1. The data analysis subsystem 5 comprises a document classification module 51 and a data surveying module 52. The document classification module 51 groups the research documents into at least two groups according to the publishing timing of each of the research documents and the judging timing. The at least two groups comprises a group of early research documents and a group of new recent research documents. The data surveying module 52 is applied to subject each of the linguistic units of the research documents to term frequency statistics, a bibliometric, and a data mining by using the processing unit 1, thereby obtaining a plurality of research keywords. In fact, the data amount of processing the term frequency statistics, the bibliometric and the data mining is too large to be handled by human minds, so the data surveying module 52 must rely on the computation capability of the processing unit 1 to obtain the plurality of research keywords.

The recommending subsystem 6 is connected to the processing unit 1. The recommending subsystem 6 comprises a word-filtering module 61. The word-filtering module 61 filters out one or more of the research keywords, of the new recent research documents, which repeat the research keywords of the early research documents and recommends the residual research keywords of the new recent research documents as new recent research keywords. For example, the research keywords captured from the early research documents contain the terms of backlight module, light guide plate and LED, and the research keywords captured from the new recent research documents contain the terms of backlight module, light guide plate, LED, diffusion sheet and brightness enhancement film; in this situation, the research keywords of the new recent research documents which repeat those of the early research documents, i.e. the terms of backlight module, light guide plate and LED, would be filtered out, and the residual keywords captured from the new recent documents, i.e. the terms of diffusion sheet and brightness enhancement film, are reserved and are recommended as new recent research keywords. Preferably, to prevent the words which are insignificant but appear with high frequency from being recommended as the new recent research keywords, the word-filtering module 61 also filters out the words which appear in lexicons or the dictionaries.

Preferably, the data analysis subsystem 5 further comprises an inverse document frequency statistics module 53 for subjecting each of the plurality of linguistic units to inverse document frequency statistics to obtain a respective correlation degree of each of the linguistic units relative to the plurality of research documents and thereby generate the plurality of research keywords, based on the respective correlation degree of each of the plurality of linguistic units. For example, a first linguistic unit would be set as one of the plurality of research keywords if the correlation degree thereof reaches a first threshold value. Furthermore, the first threshold value is customized by the user or suggested by the data analysis subsystem 5.

Further, the recommending subsystem 6 also calculates how often the new recent research keywords appear in each of the plurality of new recent research documents to obtain a respective appearing frequency or score of each of the plurality new recent research documents and thereby recommend at least one of the new recent research documents, based on the respective appearing frequency or score of each of the plurality of new recent research documents. For example, a second new recent research would be recommended if the appearing frequency or score thereof reaches a second threshold value.

In a preferred embodiment, the judging timing input via the inputting interface 2 is set by a year range n and a condition of $0<n<4$ such that the new recent research keywords are defined as prospective research keywords. The recommending subsystem 6 further includes a prospective index analysis module 63 for calculating how often the prospective research keywords appear in each of the new recent research documents to obtain a respective prospective index P of each of the new recent research documents and thereby select at least one of the new recent research documents to be set as a prospective research document, based on the respective prospective index P of each of the new recent research documents. For example, a third new recent research document would be set as a prospective research document if the prospective index P thereof reaches a third threshold value. The schematic view of the user interface of the prospective index analysis module 63 is shown in FIG. 3.

More specifically, the prospective index P is attained by the following formula:

$$P = Pr_t \times We_t \times \sum_{j=0}^{n} TF - IDF_j, \quad (1)$$

in which P represents a prospective index, $Pr_t$ represents a reference source gravity, $We_t$ represents a reference source weight, and n represents a year range and meets a condition of 0<n<4.

In a further preferred embodiment, the judging timing input via the inputting interface 2 is set by a year range n and a condition of 4≤n≤10 such that the new recent research keywords are defined as hot research keywords. The recommending subsystem 6 further comprises a hot index analysis module 64 for calculating how often the hot research keywords appear in each of the new recent research documents to obtain a respective hot index H of each of the new recent research documents and thereby select at least one of the new recent research documents to be set as a hot research document, based on the respective hot index H of each of the new recent research documents. For example, a fourth new recent research document would be set as a hot research document if the hot index H thereof reaches a forth threshold value. The schematic view of the user interface of the hot index analysis module 64 is shown in FIG. 4.

More specifically, the hot index H is attained by the following formula:

$$H = Pr_n \times We_n \times \sum_{j=0}^{n} TF - IDF_j, \quad (2)$$

in which H represents a hot index, $Pr_n$ represents a reference source gravity, $We_n$ represents a reference source weight, and n represents a year range and meets a condition of 10.

With respect to the supplementary description of TF-IDF, TF, abbreviation for "Term Frequency", reflects the number of appearing times of a particular linguistic unit in a particular document.

It is noted that a term appears more often in a document with more contents than in a document with less contents no matter how important the term is, so the number of appearing times is usually standardized to prevent its deviation toward the document with more contents. With regard to a term "$t_i$" in a single document $d_j$, its importance can be shown by the following formula:

$$tf_{i,j} = \frac{n_{i,j}}{\sum_k n_{k,j}}, \quad (3)$$

in which $n_{i,j}$ represents the number of appearing times of the term $t_i$ in a document $d_j$, and the denominator is the sum of the number of the appearing times of all terms in the document $d_j$.

IDF, abbreviation for "Inverse Document Frequency", reflects a measurement of the common importance of a term or a word. The IDE of a particular term can be obtained by dividing the total number of documents by the number of the documents containing that term and then taking the logarithm of the quotient, as shown in the following formula:

$$idf_i = \log \frac{|D|}{|\{d \cdot \in D: t_i \in d\}|}, \quad (4)$$

wherein |D| represents the total number of documents in the corpus, |{d∈D:$t_i$∈d}| represents the number of the documents containing the term $t_i$ (i.e. $n_{i,j} \neq 0$) and then $tfidf_{i,j} = tf_{i,j} \times idf_i$.

High term frequency of a term in the particular document and low document frequency of that term in the document corpus can create a high-weighting TF-IDF, so the TF-IDF is applied to filter out the common terms and reserve important words.

Figure 5:
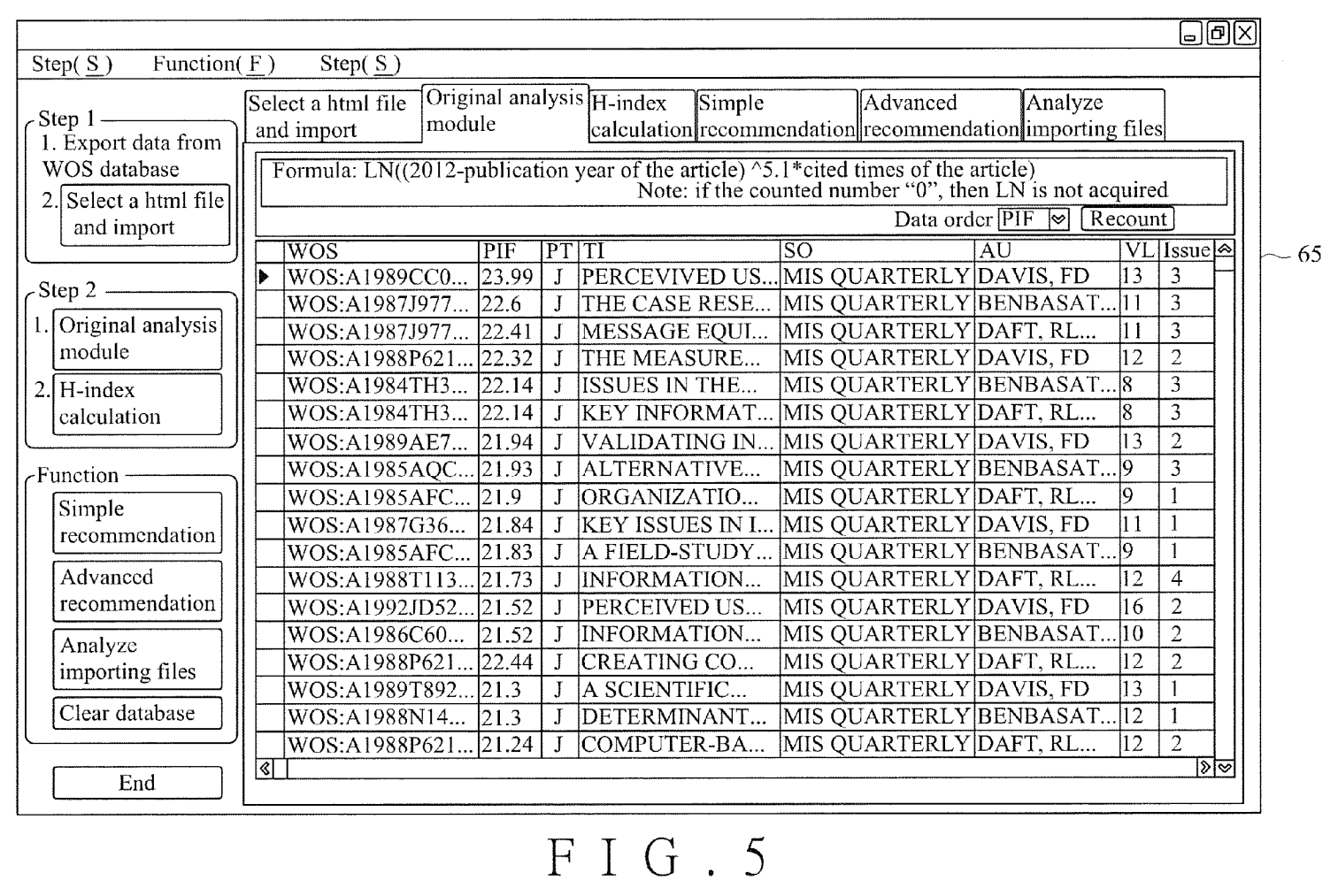

Preferably, each of the research documents includes a basic information form. The basic information form lists a respective cited-times of each of the research documents. The recommending subsystem 6 further comprises an original analysis module 65 which calculates a respective pioneer impact factor of each of the new recent research documents according to the respective cited-times and a total number of the new recent research documents and then filters out one or more of the new recent research documents whose impact factors fail to reach a threshold value. The schematic view of the user interface of the original analysis module 65 is shown in FIG. 5. The pioneer impact factor (PIF) is attained by the following formula:

$$PIF = \log \left( \sum_{c1}^{n} \frac{Ci}{s} x(cy - py)^w \right), \quad (5)$$

in which PIF represents a pioneer impact factor, Ci represents a cited-times of a particular research document, Cy represents a current year, Py represents a year of publication of the particular research document, S represents a total number of the research documents in a particular field, and W represents a constant.

Preferably, the basic information form of each of the research documents further lists a plurality of authors. The recommending subsystem 6 further includes a research capability analysis module 66 which searches for the plurality of authors of a corresponding research document respectively, on the internet, to get a plurality of research publications corresponding to each of the authors and the respective cited-times of each of the research publications as well and to perform an index calculation with respect to a total number of related publications to derive a respective research capability index of each of the authors of the corresponding research document and further to recommend at least one of the authors as a pioneer author, based on the respective research capability index of each of the plurality of authors. Accordingly, the present invention assists the user in finding out the author making a main contribution to an original research data. Likewise, the research capability analysis module 66 are able to find out a pioneer author of the prospective research document or the hot research document and to recommend the articles, of the pioneer author, of which cited-times reach a fifth threshold value as well, wherein the fifth threshold value is customized by the user or suggested by the recommending subsystem 6. Thereby, the pioneer author and those recommended articles can be provided as a focus figure and related reports, respectively, of research information news, such that the user is allowed to quickly find out suitable targets for interviewing. Hence, the present invention is especially adapted to the news field.

Preferably, the system 100 further comprises a factor estimation subsystem 7 connected to the processing unit 1. The factor estimation subsystem 7 comprises a questionnaire survey module 71 for providing at least one questionnaire and allows the recommending subsystem 6 to adjust the reference source weight according to a result of the questionnaire. The schematic views of the user interface of the factor estimation subsystem 7 are shown in FIG. 6 and FIG. 7. Specifically, FIG. 6 discloses a questionnaire 72A for evaluating factors of the prospective research documents, and FIG. 7 discloses another questionnaire 72B for evaluating factors of the hot research documents, thereby gathering statistics of the results of the questionnaires 72A, 72B and adjusting the reference source weight of each factor. Preferably, the factor estimation subsystem 7 evaluates the factors automatically at regular intervals according to the results of the questionnaires 72A, 72B, and thereby the reference source weight We in either of the formula (1) or the formula (2) is varied and adjusted automatically over time so as to adapt to a new environment or a new demand.

Preferably, the present invention further comprises a verification subsystem 8 connected to the processing unit 1. The verification subsystem 8 includes a usefulness term search module 81 and a usability term search module 82. The usefulness term search module 81 provides a usefulness-evaluation questionnaire which evaluates a usefulness of the recommending subsystem 6. The usability term search module 82 provides a usability-evaluation questionnaire which evaluates a user acceptance of the recommending subsystem 6 automatically. The schematic view of the user interface of the verification subsystem 8 is shown in FIGS. 8A and 8B, thereby gathering statistics of the result of the questionnaire and obtaining the usefulness and the usability of the present invention.

Figure 9:
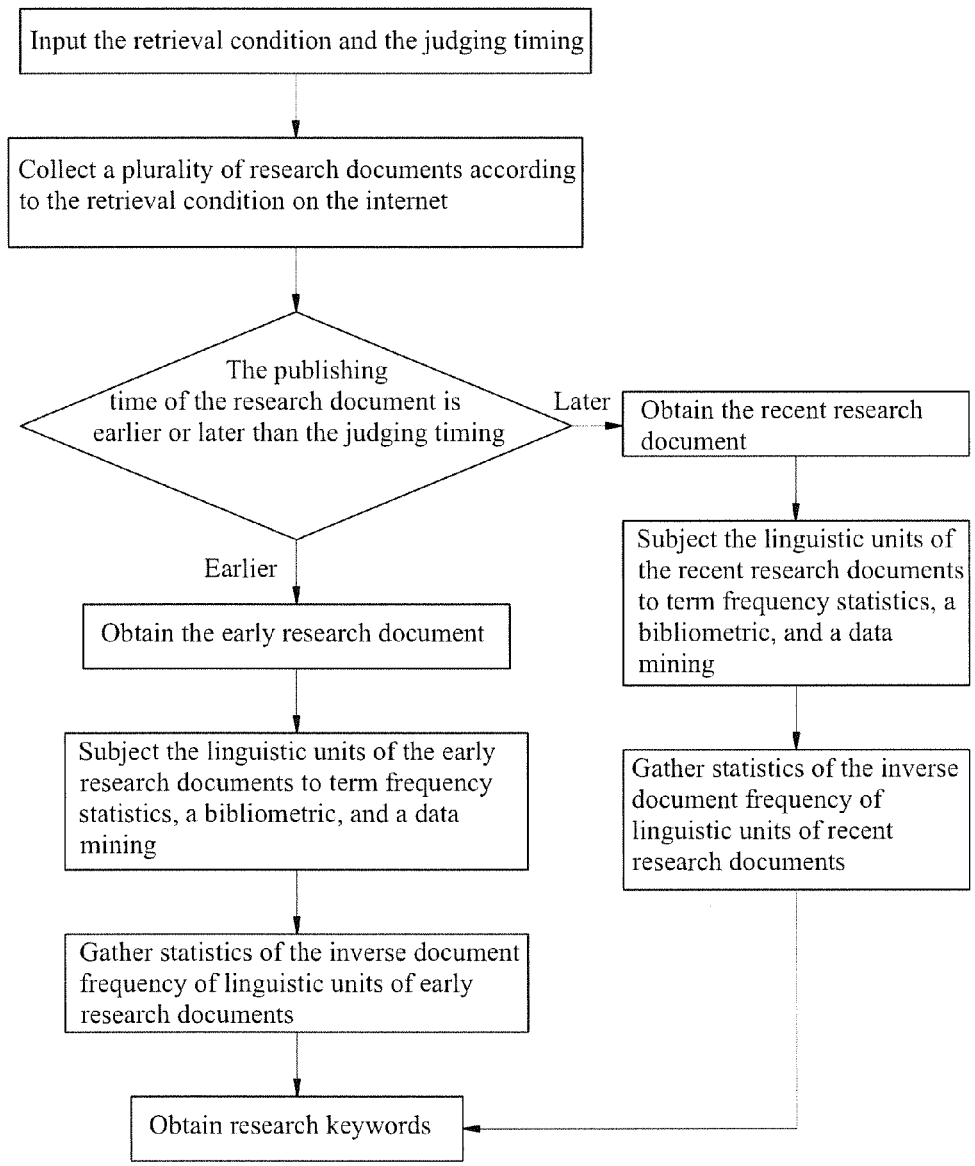
FIG. 9 is a flow diagram showing the steps of getting research keywords of the present invention.
Figure 10:
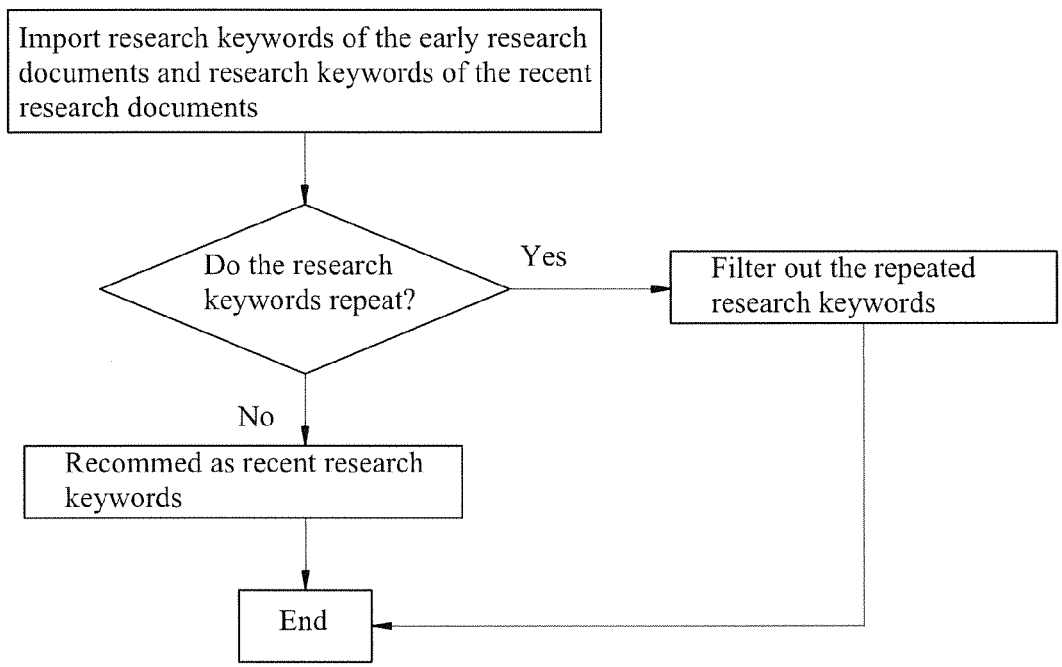
FIG. 10 is a flow diagram showing the steps of getting the new recent research keyword of the present invention.

Further referring to FIG. 9, FIG. 10, and FIG. 1, the present invention also provides a method for recommending research information news which constitutes a program product by programming and saves the program product in a recording media for being read by a computer, such as desktop computers, laptops, smart-phones, tablet computers, and PDAs. The program product can also be saved in the server for online downloading and executed by a computer system according to the following steps:

A user inputs at least one retrieval condition, for deciding a specific research field, via the inputting interface 2 to collect a plurality of correlative research documents according to the retrieval condition on an internet, thereby obtaining a publishing timing and a plurality of linguistic units from each of the correlative research documents.

Then the user inputs a judging timing via the inputting interface 2 to group the research documents into at least two groups. The at least two groups comprises a group of early research documents and another group of new recent research documents according to the publishing timing of each of the correlative research documents and the judging timing. Then, the computer system subjects the linguistic units of the early research documents and the linguistic units of the new recent research documents to term frequency statistics, a document measurement, and a data mining and uses the inverse document frequency statistics module 53 to subject the linguistic units of the early research documents and the linguistic units of the new recent research documents to inverse document frequency statistics in order to generate a plurality of research keywords.

Further, the word-filtering module 61 of the recommending subsystem 6 filters out one or more of the research keywords, of the new recent research documents, which repeat the research keywords of the early research documents and recommends the residual research keywords of the new recent research documents as new recent research keywords. Accordingly, the present invention assists the user in obtaining the prospective keywords or the hot keywords which are important to the technique and also allows user who is unfamiliar with related keywords of the field to use proper keywords in order to analyze the research documents.

The computer system uses the recommending subsystem 6 to further calculate how often the new recent research keywords appear in each of the new recent research documents so as to obtain a respective appearing frequency or score of each of the new recent research documents and recommend at least one of the new recent research documents based on the respective appearing frequency or score of each of the new recent research documents.

Figure 11A:
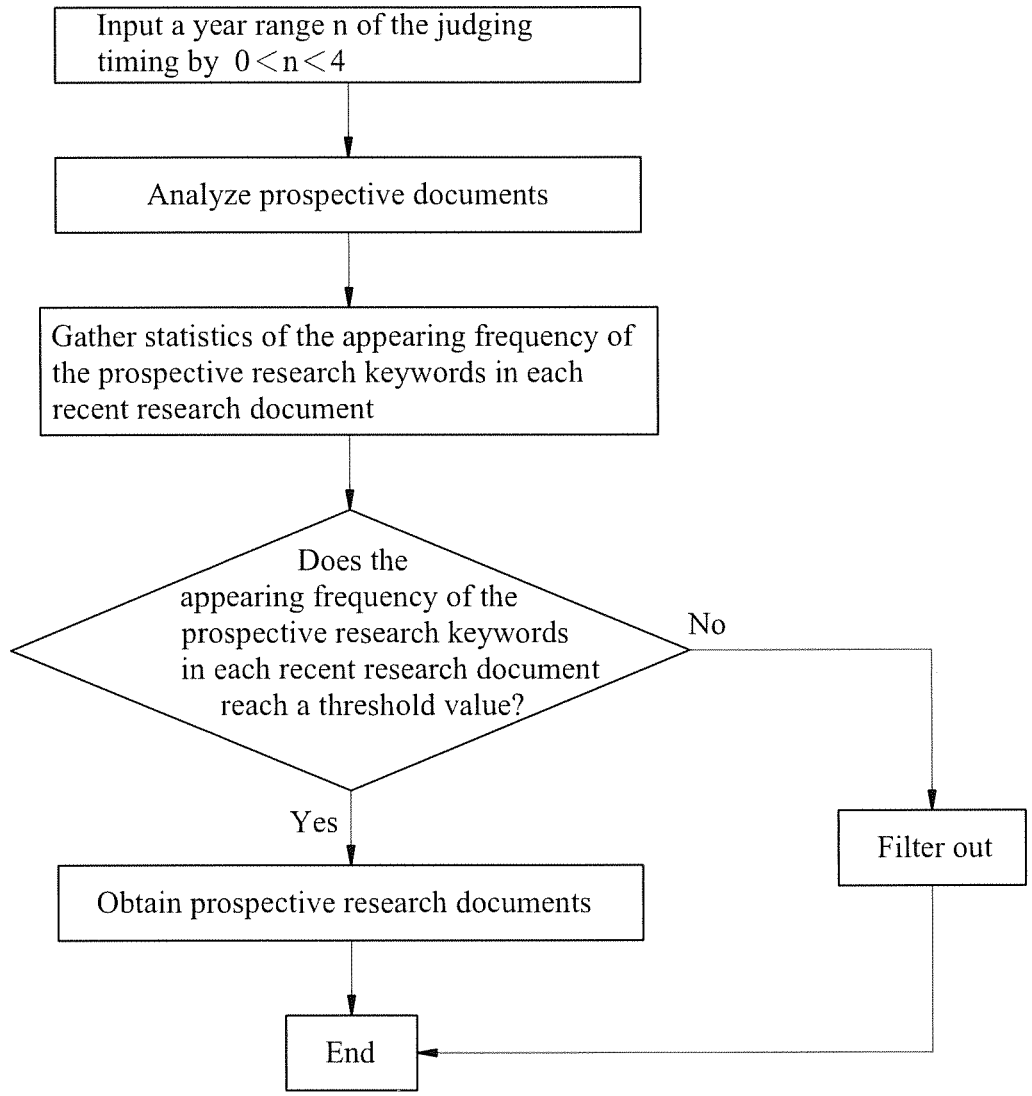
FIG. 11A is a flow diagram showing the steps of getting the prospective research document of the present invention.

Referring to FIG. 11A, if the judging timing is set by a year range n and a condition of 0<n<4, the new recent research keywords are defined as prospective research keywords. Wherein, a step of analyzing data further calculates how often the prospective keywords appear in each of the new recent research documents so as to obtain a respective prospective index of each of the new recent research documents and select at least one of the new recent research document to be set as a prospective research document based on the respective prospective index of each of the new recent research documents. Accordingly, the user can easily select the prospective research documents.

Figure 11B:
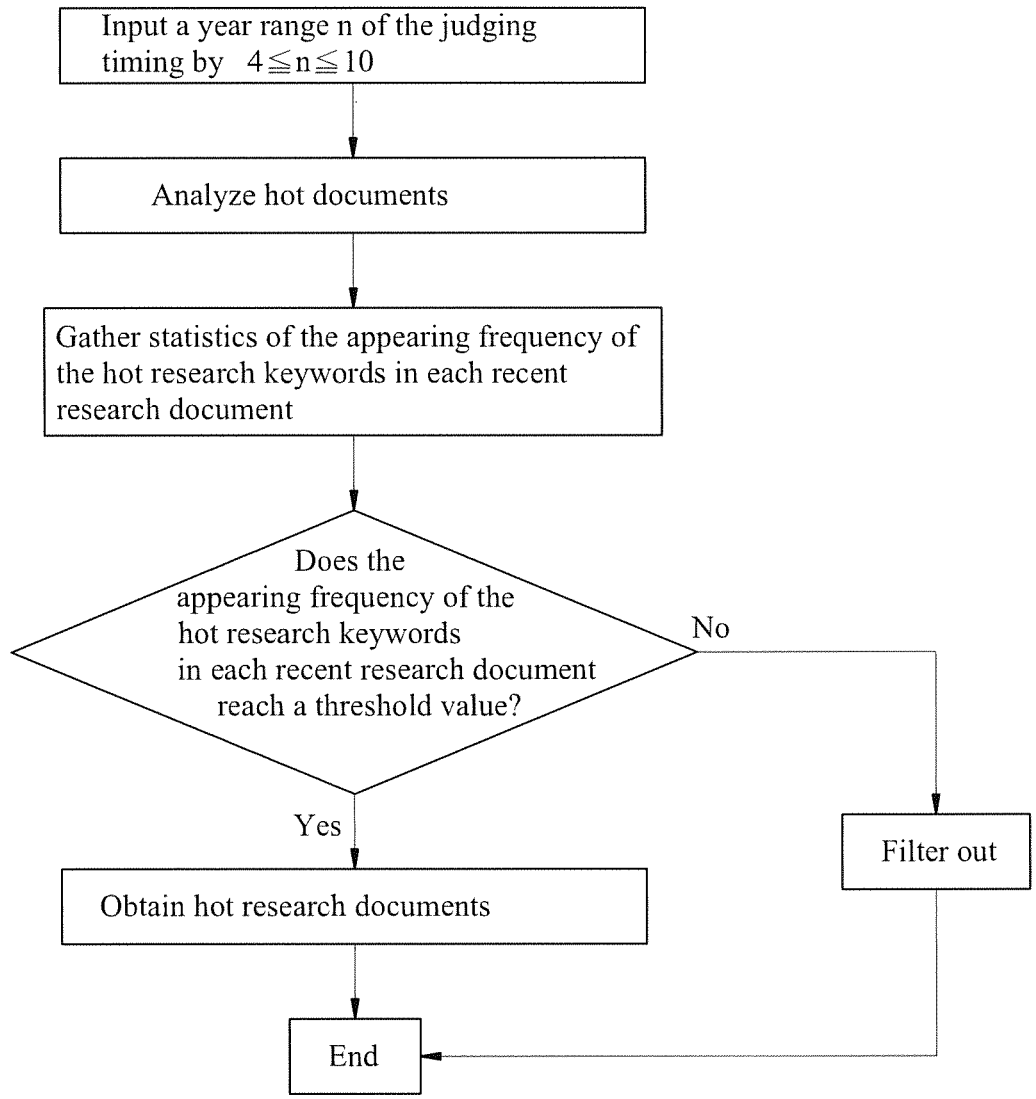
FIG. 11B is a flow diagram showing the steps of getting the hot research document of the present invention.

Referring to FIG. 11B, if the judging timing is set by a year range n and a condition of 4≤n≤10, the new recent research keywords are defined as hot research keywords. Wherein, a step of analyzing data further calculate how often the hot research keywords appear in each of the new recent research document so as to obtain a respective hot index of each of the new recent research documents and select at least one of the new recent research documents to be set as a hot research document based on the respective hot index of each of the new recent research documents. Accordingly, the user can easily select the hot research documents.

Figure 12:
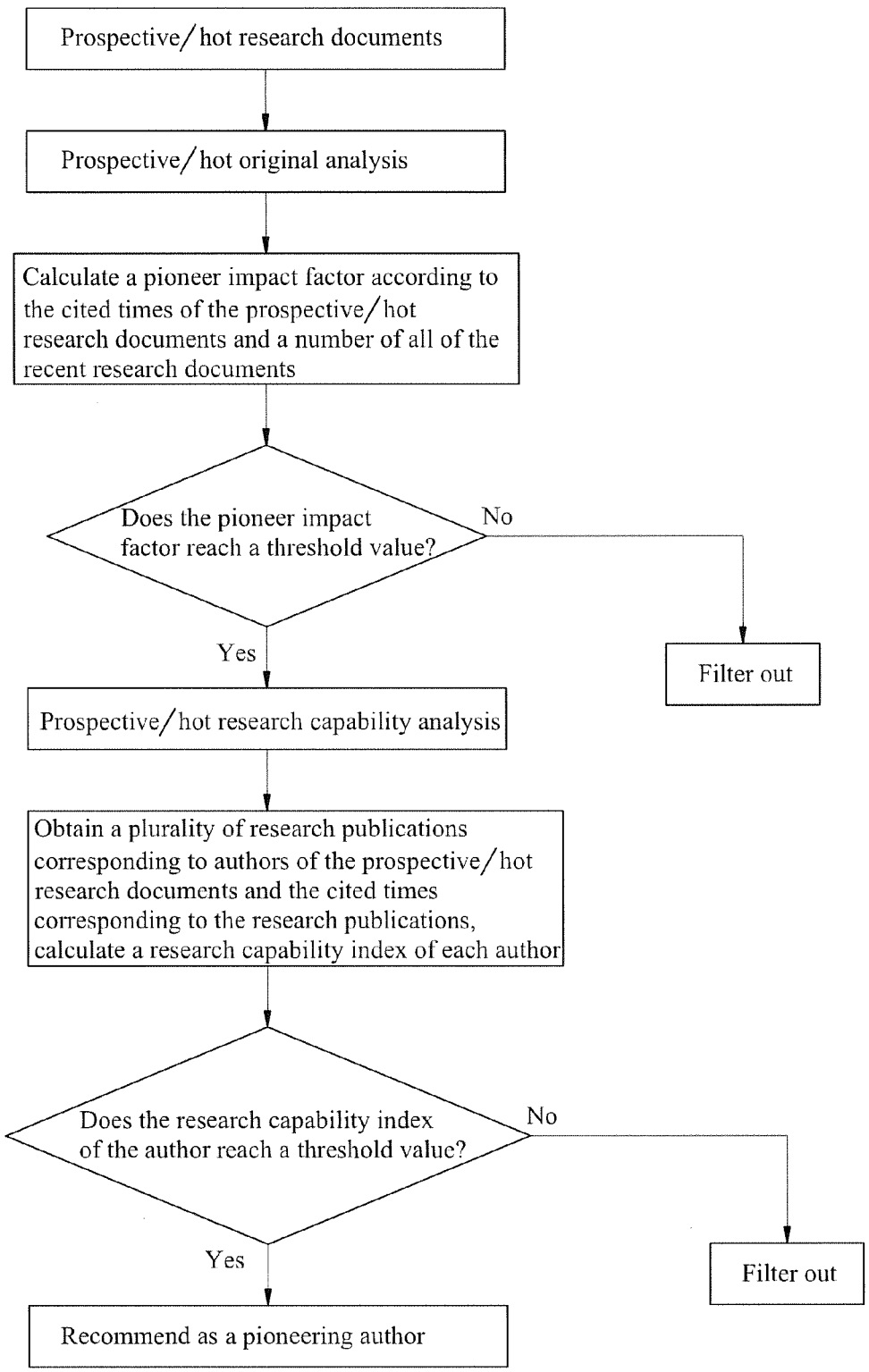
FIG. 12 is a flow diagram showing the steps of recommending the pioneering author of the present invention.

Referring to FIG. 12 and FIG. 1, after the user selects suitable research documents, the original analysis module 65 calculates a respective pioneer impact factor of each of the suitable research documents according to a respective cited-times of each of the suitable research document and a total number of the new recent research documents and then filters out one or more of the suitable research documents whose impact factors fail to reach a threshold value. Then, the user uses the research capability analysis module 66 to find out the author making the highest contribution, whereby the user can find out the suitable target quickly for making the interview.

While the embodiments, the operations, and effects of the present invention are described, it is clear that variations and modifications are made without departing from the scope of the present invention.

We claim:

1. A method, carried out by a computer, for recommending research information news, said method comprising the steps of:

collecting data, comprising the steps of:
inputting at least one retrieval condition for determining a specific research field, and
collecting a plurality of correlative research documents, on an internet, based on said at least one retrieval condition, wherein each of said plurality of correlative research documents has a respective publishing timing and a plurality of linguistic units;
analyzing data, comprising the steps of:
grouping said plurality of correlative research documents into at least two research document groups according to said respective publishing timing and a judging timing of each of said correlative research documents, wherein said at least two research document groups comprise a group of a plurality of early research documents and another group of a plurality of new recent research documents, and
using said computer system to subject said plurality of linguistic units of said early research documents and said new recent research documents to term frequency statistics, a bibliometric and a data mining to generate a plurality of research keywords; and
recommending research information, comprising the step of:
filtering out one or more of said research keywords of said new recent research documents to generate at least one new recent research keyword, said one or more of said research keywords of said new recent research documents appearing in both of said early research documents and said new recent research documents.

2. The method as claimed in claim 1, wherein said plurality of correlative research documents are adopted by patents, theses, textbooks, news, or a combination thereof, and the step of analyzing data further comprises the steps of:
subjecting each of said plurality of linguistic units to inverse document frequency statistics to obtain a respective correlation degree of each of said linguistic units relative to said plurality of correlative research documents, and
generating said plurality of research keywords based on said respective correlation degree of each of said plurality of linguistic units.

3. The method as claimed in claim 2, wherein the step of recommending research information further comprises the steps of:
calculating how often said at least one new recent research keyword appears in each of said plurality of new recent research documents to obtain a respective appearing frequency or score of each of said plurality new recent research documents, and
recommending at least one of said new recent research documents based on said respective appearing frequency or score of each of said plurality of new recent research documents.

4. The method as claimed in claim 3, wherein said judging timing is set by a year range n and a condition of 0<n<4 such that said at least one new recent research keyword is defined as a prospective research keyword, and the step of recommending research information further comprises the steps of:
calculating how often said prospective research keyword appears in each of said plurality of new recent research documents to obtain a respective prospective index of each of said plurality of new recent research documents, and selecting at least one of said new recent research documents to be set as a prospective research document based on said respective prospective index of each of said new recent research documents.

5. The method as claimed in claim 4, wherein said prospective index is attained by the following formula:

$$P = Pr_t \times We_t \times \sum_{j=0}^{n} TF - IDF_j,$$

in which P represents a foreseeing index, $Pr_t$ represents a reference source gravity, $We_t$ represents a reference source weight, and n represents a year range and meets a condition of 0<n<4.

6. The method as claimed in claim 3, wherein said judging timing is set by a year range n and a condition of 4≤n≤10 such that said at least one new recent research keyword is defined as a hot research keyword, and the step of recommending research information further comprises the steps of:
calculating how often said hot research keyword appears in each of said plurality of new recent research documents to obtain a respective hot index of each of said plurality of new recent research documents, and
selecting at least one of said new recent research documents to be set as a hot research document based on said respective hot index of each of said plurality of new recent research documents.

7. The method as claimed in claim 6, wherein said hot index is attained by the following formula:

$$H = Pr_n \times We_n \times \sum_{j=0}^{n} TF - IDF_j,$$

in which H represents a hot index, $Pr_n$ represents a reference source gravity, $We_n$ represents a reference source weight, and n represents a year range and meets a condition of 4≤n≤10.

8. The method as claimed in claim 3, wherein each of said plurality of correlative research documents has a respective basic information form, said respective basic information form listing a respective cited-times, and the step of recommending research information further comprises the steps of:
calculating a respective pioneer impact factor of each of said plurality of new recent research documents according to said respective cited-times and a total number of said plurality of new recent research documents, and
filtering out one or more of said new recent research documents, said one or more of said new recent documents having respective pioneer impact factors failing to reach a threshold value.

9. The method as claimed in claim 8, wherein said pioneer impact factor is attained by the following formula:

$$PIF = \log\left(\sum_{ci}^{n} \frac{Ci}{S} x(cy - py)^w\right),$$

in which PIF represents a pioneer impact factor, Ci represents a cited-times of a particular research document, Cy represents a current year, Py represents a year of publication of said particular research document, S represents a total number of research documents in a particular field, and W represents a constant.

10. The method as claimed in claim 1, wherein each of said plurality of correlative research documents has a respective basic information form, said respective basic information form listing a plurality of authors, and the step of recommending research information further comprises the steps of:

searching for said plurality of authors of a corresponding research document respectively, on said internet, to get a plurality of research publications corresponding to each of said plurality of authors and a respective cited-times of each of said research publications as well and to derive a respective research capability index of each of said plurality of authors, and recommending at least one of said authors based on said respective research capability index of each of said plurality of authors.

11. The method as claimed in claim 5, further comprising the steps of:

factor estimating, comprising the step of:
providing at least one questionnaire to adjust said reference source weight according to a result of said questionnaire, and verifying, comprising the steps of:
providing a usefulness evaluation questionnaire to evaluate a usefulness of the step of recommending research information, and
providing a usability evaluation questionnaire to evaluate a user acceptance of the step of recommending research information.

12. The method as claimed in claim 7, further comprising the steps of:

factor estimating, comprising the step of:
providing at least one questionnaire to adjust said reference source weight according to a result of said questionnaire, and verifying, comprising the steps of:
providing a usefulness evaluation questionnaire to evaluate a usefulness of the step of recommending research information, and
providing a usability evaluation questionnaire to evaluate a user acceptance of the step of recommending research information.

13. A system for recommending research information news comprising:

a processing unit;

an inputting interface connected to said processing unit for inputting a retrieval keyword and a judging timing, said retrieval keyword used to determine a specific research field;

a database group connected to said processing unit, said database group comprising a setting database and a research document database, said setting database being applied to save said retrieval keyword and said judging timing;

a data collecting subsystem connected to said processing unit for collecting a plurality of research documents and saving said research documents in said research document database, said research documents each including a plurality of linguistic units and a respective publishing timing;

a data analysis subsystem connected to said processing unit, said data analysis subsystem comprising a document classification module and a data surveying module, said document classification module grouping said research documents into at least two groups according to said respective publishing timing of each of said research documents and said judging timing as well, said at least two groups comprising a group of a plurality of early research documents and another group of a plurality of new recent research documents, said data surveying module subjecting said plurality of linguistic units of each of said research documents to term frequency statistics, a document measurement, and a data mining by using said processing unit to obtain a plurality of research keywords; and a recommending subsystem connected to said processing unit, said recommending subsystem comprising a word-filtering module, said word-filtering module filtering out one or more of said research keywords of said new recent research documents to generate at least one new recent research keyword, said one or more of said research keywords of said new recent research documents appearing in both of said early research documents and said new recent research documents.

14. The system as claimed in claim 13, wherein said data analysis subsystem further comprises an inverse document frequency statistics module for subjecting each of said plurality of linguistic units to inverse document frequency statistics to obtain a respective correlation degree of each of said linguistic units relative to said plurality of research documents and generating said plurality of research keywords based on said respective correlation degree of each of said plurality of linguistic units, and said recommending subsystem is further applied to calculate how often said at least one new recent research keyword appears in each of said plurality of new recent research documents to obtain a respective appearing frequency or score of each of said plurality new recent research documents and recommend at least one of said new recent research documents based on said respective appearing frequency or score of each of said plurality of new recent research documents.

15. The system as claimed in claim 14, wherein said judging timing is set by a year range n and a condition of 0<n<4 such that said at least one new recent research keyword is defined as a prospective research keyword, and said recommending subsystem further comprises a prospective index analysis module for calculating how often said prospective research keyword appears in each of said plurality of new recent research documents to obtain a respective prospective index of each of said plurality of new recent research documents and selecting at least one of said new recent research documents to be set as a prospective research document based on said respective prospective index of each of said new recent research documents.

16. The system as claimed in claim 15, wherein said prospective index is attained by the following formula:

$$P = Pr_t \times We_t \times \sum_{j=0}^{n} TF - IDF_j,$$

in which P represents a prospective index, $Pr_t$ represents a reference source gravity, $We_t$ represents a reference source weight, and n represents a year range and meets a condition of 0<n<4.

17. The system as claimed in claim 14, wherein said judging timing is set by a year range n and a condition of 4≤n≤10 such that said at least one new recent research keywords is defined as a hot research keyword, and said recommending subsystem further comprises a hot index analysis module for calculating how often said hot research keyword appears in each of said plurality of new recent research documents to obtain a respective hot index of each of said plurality of new recent research documents and selecting at least one of said new recent research documents to be set as a hot research document based on said respective hot index of each of said plurality of new recent research documents.

18. The system as claimed in claim 17, wherein said hot index is attained by the following formula:

$$H = Pr_n \times We_n \times \sum_{j=0}^{n} TF - IDF_j,$$

in which H represents a hot index, $Pr_n$ represents a reference source gravity, $We_n$ represents a reference source weight, and n represents a year range and meets a condition of $4 \leq n \leq 10$.

19. The system as claimed in claim 14, wherein each of said plurality of research documents has a respective basic information form, said respective basic information form lists a respective cited-times, and said recommending subsystem further comprises an original analysis module for calculating a respective pioneer impact factor of each of said plurality of new recent research documents according to said respective cited-times and a total number of said plurality of new recent research documents and filtering out one or more of said new recent research documents, said one or more of said new recent research documents having pioneer impact factors failing to reach a threshold value, wherein said respective pioneer impact factor is attained by the following formula:

$$PIF = \log\left(\sum_{c1}^{n} \frac{Ci}{s} x(cy - py)^w\right),$$

in which PIF represents a pioneer impact factor, Ci represents a cited-times of a particular research document, Cy represents a current year, Py represents a year of publication of said particular research document, S represents a total number of research documents in a particular field, and W represents a constant.

20. The system as claimed in claim 19, wherein said respective basic information form of each of said research documents further lists a plurality of authors, and said recommending subsystem further includes a research capability analysis module for searching for said plurality of authors of a corresponding research document respectively, on said internet, to get a plurality of research publications corresponding to each of said plurality of authors and a respective cited-times of each of said research publications as well and to perform an index calculation with respect to a total number of related publications to derive a respective research capability index of each of said authors of said corresponding research document and recommending at least one of said authors as a pioneering author based on said respective research capability index of each of said plurality of authors.

21. The system as claimed in claim 16, further comprising a factor estimation subsystem and a verification subsystem both connected to said processing unit, wherein said factor estimation subsystem comprises a questionnaire survey module to provide at least one questionnaire and allows said recommending subsystem to automatically adjust said reference source weight according to a result of said questionnaire, and said verification subsystem includes a usefulness term search module and a usability term search module, said usefulness term search module providing a usefulness-evaluation questionnaire for evaluating a usefulness of said recommending subsystem, said usability term search module providing a usability-evaluation questionnaire for automatically evaluating a user acceptance of said recommending subsystem.

22. The system as claimed in claim 18, further comprising a factor estimation subsystem and a verification subsystem both connected to said processing unit, wherein said factor estimation subsystem comprises a questionnaire survey module to provide at least one questionnaire and allows said recommending subsystem to automatically adjust said reference source weight according to a result of said questionnaire, and said verification subsystem includes a usefulness term search module and a usability term search module, said usefulness term search module providing a usefulness-evaluation questionnaire for evaluating a usefulness of said recommending subsystem, said usability term search module providing a usability-evaluation questionnaire for automatically evaluating a user acceptance of said recommending subsystem.

* * * * *